US011074539B2

(12) United States Patent
Tiderington

(10) Patent No.: US 11,074,539 B2
(45) Date of Patent: Jul. 27, 2021

(54) VEHICLE USAGE ASSESSMENT OF DRIVERS IN A CAR SHARING SERVICE

(71) Applicant: General Motors LLC, Detroit, MI (US)

(72) Inventor: Robert E. Tiderington, Grosse Pointe Farms, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 102 days.

(21) Appl. No.: 16/149,620

(22) Filed: Oct. 2, 2018

(65) Prior Publication Data

US 2020/0104778 A1 Apr. 2, 2020

(51) Int. Cl.
| | |
|---|---|
| *G06Q 10/06* | (2012.01) |
| *G07C 5/00* | (2006.01) |
| *G07C 5/08* | (2006.01) |
| *G01C 21/34* | (2006.01) |

(52) U.S. Cl.
CPC ... *G06Q 10/06398* (2013.01); *G01C 21/3438* (2013.01); *G07C 5/008* (2013.01); *G07C 5/085* (2013.01)

(58) Field of Classification Search
None
See application file for complete search history.

(56) References Cited

U.S. PATENT DOCUMENTS

| | | | | |
|---|---|---|---|---|
| 8,694,328 B1* | 4/2014 | Gormley | ............. | B60R 16/0373 |
| | | | | 705/1.1 |
| 8,965,791 B1* | 2/2015 | Bell | ............. | G06Q 20/204 |
| | | | | 705/24 |
| 2003/0120522 A1* | 6/2003 | Uyeki | ............. | G06Q 10/02 |
| | | | | 705/5 |
| 2007/0202857 A1* | 8/2007 | Hara | ............. | G07C 5/008 |
| | | | | 455/414.1 |
| 2008/0065396 A1* | 3/2008 | Marshall | ............. | G06Q 10/10 |
| | | | | 705/16 |
| 2011/0153629 A1* | 6/2011 | Lehmann | ............. | G06Q 30/06 |
| | | | | 707/758 |
| 2012/0110466 A1* | 5/2012 | Tan | ............. | G05B 23/0272 |
| | | | | 715/744 |
| 2013/0173284 A1* | 7/2013 | Hyde | ............. | G06F 19/3456 |
| | | | | 705/2 |
| 2013/0325521 A1* | 12/2013 | Jameel | ............. | G06Q 10/02 |
| | | | | 705/5 |

(Continued)

*Primary Examiner* — Sujay Koneru
(74) *Attorney, Agent, or Firm* — Cantor Colburn LLP

(57) ABSTRACT

A method and system for use in performing a vehicle usage assessment for a first driver of a vehicle participating in a car sharing service based on a vehicle condition assessment of the vehicle by a second, subsequent driver. The method carried out by the system includes the steps of providing a user assessment interface that enables the second driver to provide one or more quantified assessments for one or more corresponding characteristics of the vehicle; receiving the one or more quantified assessments; associating the one or more quantified assessments with an immediately preceding first driver of the vehicle; and generating an overall assessment for the first driver using at least one of the one or more quantified assessments. The overall assessment may be used to rank the first driver relative to other drivers participating in the car sharing service.

17 Claims, 3 Drawing Sheets

(56) References Cited

U.S. PATENT DOCUMENTS

| | | | | |
|---|---|---|---|---|
| 2014/0156517 A1* | 6/2014 | Argue | G06Q 20/209 |
| | | | 705/40 |
| 2015/0206206 A1* | 7/2015 | Puente | G06Q 30/0283 |
| | | | 705/307 |
| 2015/0310379 A1* | 10/2015 | Farrelly | G06Q 10/20 |
| | | | 705/7.15 |
| 2015/0363986 A1* | 12/2015 | Hoyos | H04W 4/40 |
| | | | 340/5.61 |
| 2016/0027307 A1* | 1/2016 | Abhyanker | G06Q 50/01 |
| | | | 701/117 |
| 2016/0042303 A1* | 2/2016 | Medina | H04W 4/024 |
| | | | 705/5 |
| 2016/0171574 A1* | 6/2016 | Paulucci | G01C 21/3697 |
| | | | 705/13 |
| 2016/0244067 A1* | 8/2016 | Hunt | B60W 50/14 |
| 2016/0267581 A1* | 9/2016 | Huang | G06Q 40/00 |
| 2016/0364678 A1* | 12/2016 | Cao | G06Q 50/30 |
| 2017/0200321 A1* | 7/2017 | Hummel | G06Q 30/0611 |
| 2017/0255966 A1* | 9/2017 | Khoury | H04L 67/20 |
| 2017/0345227 A1* | 11/2017 | Allen, Jr. | G07C 5/008 |
| 2017/0352082 A1* | 12/2017 | Aziz | G06Q 30/0278 |
| 2018/0033058 A1* | 2/2018 | Mukherjee | H04L 67/306 |
| 2018/0225749 A1* | 8/2018 | Shoen | G06Q 30/0645 |
| 2018/0376357 A1* | 12/2018 | Tavares Coutinho | |
| | | | H04W 48/20 |
| 2019/0196503 A1* | 6/2019 | Abari | G06Q 10/063 |
| 2019/0227570 A1* | 7/2019 | Miller | G07C 5/0825 |
| 2019/0287166 A1* | 9/2019 | Mitsumaki | G07B 15/00 |
| 2019/0354903 A1* | 11/2019 | Seki | G06Q 30/0284 |
| 2019/0383622 A1* | 12/2019 | Aich | G01C 21/3661 |
| 2020/0094848 A1* | 3/2020 | Hu | G07C 5/008 |
| 2020/0103905 A1* | 4/2020 | Gurin | G05D 1/0088 |

* cited by examiner

US 11,074,539 B2

VEHICLE USAGE ASSESSMENT OF DRIVERS IN A CAR SHARING SERVICE

INTRODUCTION

The present invention relates to methods and systems for rating drivers in a vehicle sharing service.

With an increasing trend toward utilizing car sharing services and the growing number of people that may utilize vehicles for short term hourly or daily rentals, there exists the possibility that the vehicles may suffer some excessive wear and tear from inconsiderate, careless, or messy drivers.

SUMMARY

According to one aspect of the invention, there is provided a method of performing a computer implemented method of generating a vehicle usage assessment for a first driver of a vehicle participating in a car sharing service based on a vehicle condition assessment of the vehicle that is provided by a second, subsequent driver, the method comprising the steps of providing a user assessment interface configured to communicate with a server system, the user assessment interface including a graphical user interface for display by a screen device, the graphical user interface providing a second, subsequent driver with one or more input fields by which the second driver provides one or more quantified assessments for one or more corresponding characteristics of the vehicle in the car sharing service; receiving, by the server system, the one or more quantified assessments provided by the second driver for the one or more characteristics of the vehicle; associating, by the server system, the one or more quantified assessments with an immediately preceding first driver of the vehicle; and generating, by the server system, an overall assessment for the first driver using at least one of the one or more quantified assessments, wherein the overall assessment is represented by a score on a quantified scale.

According to various embodiments, this method may further include any one of the following features or any technically-feasible combination of some or all of the following features:
  the overall assessment includes a single overall average score calculated from different quantified assessments for different characteristics of the vehicle, or a plurality of calculated average scores for each of a plurality of the different characteristics of the vehicle.
  the receiving step further comprises receiving a plurality of quantified assessments, each corresponding to a different one of the characteristics of the vehicle, and wherein the quantified assessments are weighted relative to each other when generating the overall assessment.
  the score comprises a ranking of the first driver relative to other drivers subscribed to the car sharing service that is based on the overall assessment. Also, optionally, when the overall assessment for the first driver exceeds a predetermined threshold, the first driver is given a reward by the car sharing service.
  the method further comprises the steps of:
    providing by the server system a tip pool comprising funds collected by the car sharing service; and
    receiving a tip request from the second, subsequent driver, specifying a tip amount to be provided to the first driver; and
    paying or crediting the first driver with the tip amount from the tip pool.
  the screen device is a smartphone carried by the second driver and wherein the providing step further comprises transmitting an app to the smartphone, wherein the graphical user interface is provided by the app when the app is executing on the smartphone. Optionally, the method may then further comprise receiving at the server system a comment or photo entered into the app by the second driver.
  the first driver has a smartphone that includes an app and wherein either the overall assessment and/or the quantified assessment of the one or more characteristics are received by the app on the first driver's smartphone and are displayed via the graphical user interface of the app on the first driver's smartphone.
  the screen device is a touchscreen display in the vehicle, whereby the providing step further comprises installing the user assessment interface in the vehicle either during manufacturing of the vehicle or by downloading the user assessment interface to the vehicle via a vehicle telematics unit.
  the subsequent driver confirms, via the graphical user interface, that the vehicle usage assessment provided is for the vehicle the subsequent driver is presently assessing.
  the one or more characteristics of the vehicle comprise characteristics from two or more of the following categories: exterior vehicle condition, interior vehicle condition, vehicle cleanliness, fuel level, charge level, and radio station settings.
  the method further comprises the step of determining a point value for the first driver based at least in part on the overall assessment, in which case the point value may represent a total amount of points earned by the first driver in the car sharing service, and the method may then further comprise the step of providing the first driver with a reward by the car sharing service using the points.

According to another aspect of the invention, there is provided a system for use in generating a vehicle usage assessment for a first driver of a vehicle participating in a car sharing service based on a vehicle condition assessment of the vehicle that is provided by a second subsequent driver, the system comprising at least one computing device having an electronic processor, computer-readable memory accessible by the processor, and software stored on the memory that when executed by the processor configures the system to: (a) receive from the second driver one or more quantified assessments of one or more corresponding characteristics of the vehicle, wherein the one or more quantified assessments are received from the second driver via a graphical user interface on a smartphone carried by the second driver; (b) receive, from the second driver via the smartphone, comments and/or photos indicative of at least some of the one or more characteristics; (c) associate the one or more quantified assessments with an immediately preceding first driver; (d) determine an overall assessment for the first driver using at least one of the one or more quantified assessments; and (e) send the overall assessment to a smartphone carried by the first driver.

According to various embodiments, the system of the preceding paragraph may further include any one of the following features or any technically-feasible combination of some or all of the following features:
  the software, when executed by the processor, configures the system to provide the first driver with at least one of the comments and/or photos.

the software, when executed by the processor, configures the computing device to: rank the first driver relative to other drivers participating in the car sharing service based on the overall assessment; and/or determine a point value for the first driver based at least in part on the one or more quantified assessments.

the one or more quantified assessments are received via an app executing on the second driver's smartphone, the app being configured to cause the second driver's smartphone to transmit the one or more quantified assessments to the computing device at a remote facility.

the software, when executed by the processor, configures the system to:
provide a tip pool comprising funds collected by the car sharing service; and
receive a tip request from the second, subsequent driver, specifying a tip amount to be provided to the first driver; and
pay or credit the first driver with the tip amount from the tip pool.

According to a third aspect of the invention, there is provided a non-transitory computer-readable medium for use in generating a vehicle usage assessment for a first driver based upon a vehicle condition assessment of a vehicle provided by a second, subsequent driver of the vehicle, the computer-readable medium having stored thereon software that, when executed by an electronic processor, configures the processor to: (a) receive from the second driver one or more quantified assessments of one or more corresponding characteristics of the vehicle, wherein the one or more quantified assessments are received from the second driver via a graphical user interface on a smartphone carried by the second driver; (b) associate the one or more quantified assessments with an immediately preceding first driver; (c) determine an overall assessment for the first driver using at least one of the one or more quantified assessments; (d) rate the first driver relative to other drivers participating in the car sharing service based on the overall assessment; and (e) send the rating to a smartphone carried by the first driver.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

Figure 1:
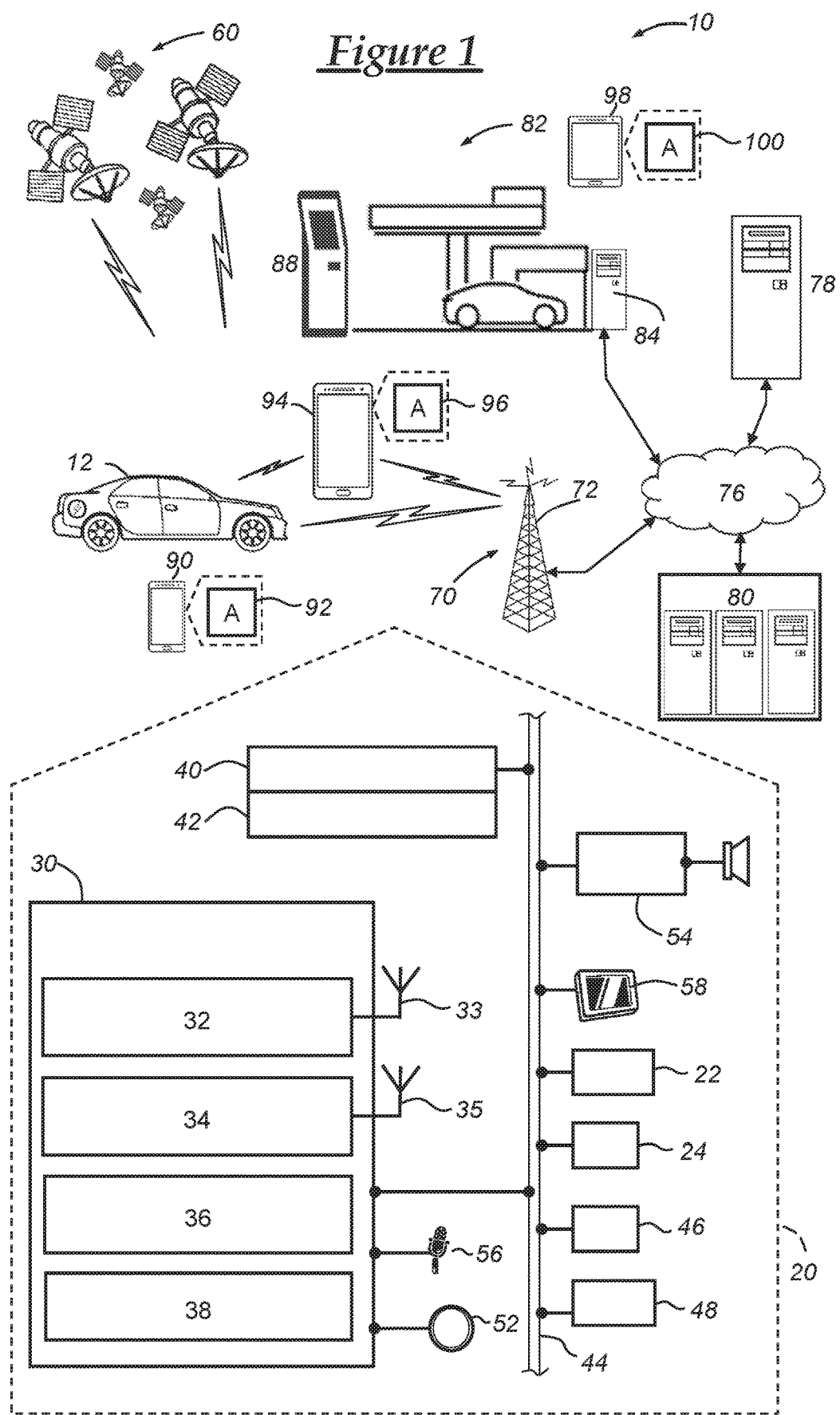
FIG. 1 is a block diagram depicting an embodiment of a communications system that is capable of utilizing the method disclosed herein.

The methods and system described below provide a way for a second, subsequent driver of a shared vehicle to assess the condition of the vehicle upon initially obtaining the vehicle after use by a first driver. In this way the second driver is able to rate the prior driver indirectly, by rating the condition of the vehicle and the second driver's experience following the first driver's use of the vehicle. The rating can be based on things such as fuel level, charge level, vehicle cleanliness, exterior condition, interior condition, and radio settings to name a few. The ratings are used to develop a rating and/or ranking the immediately preceding prior driver. The ratings may also be used in a point system and drivers may either be awarded points or lose points depending on the ratings. Drivers are able to collect points and use the points towards credits, prizes, and to cover fuel or cleaning fees in the car sharing service. Drivers may also lose points for negative ratings attributed to their use of the vehicle. If the vehicle usage assessment ratings attributed to a first driver are consistently negative the first driver may lose the ability to participate in the car sharing service. In this way the rating system creates a self-policing community in which drivers are incentivized to take better care of the vehicles, creates a loyalty program, and helps to grow membership in the car sharing service by helping to establish a trusted service.

According to some embodiments, the method and/or system can enable a vehicle usage assessment by a subsequent driver through the use of a computing device having a graphical user interface (GUI), referred to generally herein as a screen device. Suitable screen devices may include fixed or mobile devices. Fixed screen devices may include desktop and other personal computers, as well as computer terminals or kiosks such as may be located at a field operations center. Mobile devices can be wireless devices including handheld devices such as tablets, smartphones, as well as OEM or aftermarket vehicle-mounted telematics units and other such devices that are capable of using wireless technology to communicate. In one embodiment, the screen device used to carry out portions of the methods disclosed herein can be a smartphone which has the appropriate application ("app") downloaded or installed on it wherein the graphical user interface is provided by the app when the app is running on the smartphone.

In one embodiment, the method can be used for generating a vehicle usage assessment for a first driver (FD) of a vehicle participating in a car sharing service based on a vehicle condition assessment provided by a second, subsequent driver (SSD). In this way, the SSD can provide a quantified assessment of the vehicle without directly rating the driver. Instead the assessment is more of a reflection of the second driver's experience following the FD. This method can include initiating a vehicle usage assessment with a SSD by providing to the second driver a graphical user interface for display on the SSD's smartphone or other screen device. The graphical user interface provides one or more input fields associated with characteristics of the vehicle in the car sharing service. Those characteristics can be, but are not limited to, cleanliness, fuel level, interior vehicle condition, exterior vehicle condition, overall vehicle condition, odor, and radio station settings. The second driver is able to enter a quantified assessment into the input fields for the one or more corresponding characteristics of the vehicle in the car sharing service. The quantified assessment could be a simple numerical rating such as 0 through 10, a percentage of 0% to 100%, 0-5 stars and other various quantified scales. The input fields may be pre-populated and all the SSD has to do is select a choice a from the options provided. On the other hand, the input fields may be empty and the SSD is able to enter a quantified assessment of their own choosing by way of a keyboard or some other means of input. In this scenario, the input fields may be accompanied with instructions as to what form the input should be. Additionally, input fields may be provided that allow for images and comments to be submitted.

Once the second driver has entered the quantified assessments and they have been received by a server system, they can then be used to generate an overall assessment for the FD in the form of a score (e.g., a rating or ranking) that is associated with the FD. The overall assessment could be based on a single average for the different quantified assessments or it could be a plurality of calculated average scores for each of a plurality of the different characteristics of a vehicle. By way of example, the score could be displayed in any number of ways such as a graph, a percentage, a letter grade, a number on a scale such as 1 through 10, a number of stars on a scale of 5 stars, just to name a few.

The quantified assessment can be assigned to the FD in any of a number of different ways. In one scenario, when reservations have been made ahead of time, the data may be prepopulated into the server system and the driver's identity may be attached to a specific vehicle and time slot. For example, FD is attached to vehicle X at noon and SSD is attached to vehicle X at the next available slot immediately after FD which is 3:00 pm. When SSD arrives at 3:00 pm to pick up vehicle X, SSD will receive a vehicle condition assessment request for vehicle X. Once the vehicle condition assessment is completed and received, the system will assign the results of the assessment to the driver of the vehicle in the time slot immediately preceding the SSD, which here would be FD. In another embodiment, perhaps the vehicle is not pre-assigned to an SSD. In this instance the SSD may be required to enter identifying information when he/she receives a request for a vehicle condition assessment. Here again the vehicle is linked to the FD, so when the vehicle information is received the system uses a data base to determine who the last driver of the vehicle was and the assessment results are assigned to that driver.

Separately, the SSD may be authorized by the system to provide a tip amount to the FD from a pool of money amassed or otherwise provided by the car sharing service. This pool may come from user receipts and may be used to provide an incentivized reward to drivers for returning vehicles in exceptional condition that is appreciated by the SSD. For example, returning a car that the FD washed or left with desirable climate control or radio settings. For this purpose, the SSD may be authorized to specify a tip amount that is paid to the FD or provided as a credit on the FD's account with the car sharing service.

It should be noted that unique user names may be employed by drivers in the vehicle sharing community for purposes of anonymity and member safety. Furthermore, the identity of the SSD that provides the quantified assessments does not need to be directly linked to the responses. The responses may be simply linked to the vehicle. When attributing the resulting score/ranking it may be linked to the FD and the FD may have a unique user/screen name. In this way when ranking lists are generated and posted they will use the unique user/screen name so as to protect the identity of the drivers.

With reference to FIG. 1, there is shown an operating environment that comprises communication system 10 that can be used to implement a method 200 (FIG. 2) disclosed herein. The communications system 10 may be used to implement a car sharing service that allows drivers to reserve and use vehicles for a period of hours, days, or longer. The communications system 10 generally includes a vehicle 12 with a wireless communications device 30, a constellation of satellites 60, a wireless carrier system 70, a land communications network 76, a computer 78, a remote facility 80, a field operations center 82, and various wireless devices, including a stationary mobile device 84 at the field operations center 82, a first mobile wireless device 90 carried by a first driver (FD) whom reserved and used the vehicle 12, a second mobile wireless device 94 carried by a subsequent, second driver (SSD), and a third mobile wireless device 98 that may be used by the field operations center. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of a type of the vehicle communications system 10; however, other systems not shown here could employ the disclosed method as well.

The remote facility 80 may be a single or distributed central facility that provides one or more servers (i.e., computing devices) that may be used to implement the car sharing service and the methods disclosed herein. This can include some or all aspects of the car sharing service, such as the management of the vehicle reservations, user accounts, as well as the storage of vehicle usage assessment received from drivers, as well as the generation and storage of the driver assessments and rankings that are used in the method and system disclosed herein. The field operations center 82 may be a physical location where cars in the reservation system may be kept or processed between reservations, and may be used in some embodiments by the drivers to input the vehicle usage assessments. Further details of the remote facility 80 and field operations center 82 is described further below.

The wireless carrier system 70 may be any of one or more suitable cellular telephone systems. The carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect the wireless carrier system 70 with the land network 76 or to connect the wireless carrier system 70 with user equipment (UE) (e.g., the wireless communications device 30, or the mobile wireless devices 90, 94, and 98). The wireless carrier system 70 can implement any suitable communications technology, including for example GSM/GPRS technology, CDMA or CDMA2000 technology, LTE technology, etc. In general, the wireless carrier systems 70, their components, the arrangement of their components, the interaction between the components, etc. is generally known in the art.

Apart from using the wireless carrier system 70, a different wireless carrier system in the form of satellite communication can be used to provide uni-directional or bi-directional communication with the server and screen device, mobile device, or smartphone. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the SSD or FD and the uplink transmitting station. By way of example of the bi-directional communication can be used to transmit the vehicle usage assessment, quantified assessment, overall assessment, rank, reward, and images just to name a few. If used, this satellite telephony can be utilized either in addition to or in lieu of the wireless carrier system 70.

The land network 76 may be a conventional land-based telecommunications network that is connected to one or more landline telephones and connects the wireless carrier system 70 to the remote facility 80. For example, the land network 76 may include a public switched telephone network (PSTN) such as that used to provide hardwired telephony, packet-switched data communications, and/or the Internet infrastructure. One or more segments of the land network 76 could be implemented through the use of a standard wired network, a fiber or other optical network, a cable network, power lines, other wireless networks such as wireless local area networks (WLANs), networks providing broadband wireless access (BWA), or any combination thereof.

The computer 78 can be one or more computers (only one shown) accessible via a private or public network such as the Internet. Each such computer 78 can be used for one or more purposes, such as a web server accessible by the vehicle in car sharing service 12, the first mobile wireless device 90, or the second mobile wireless device 96. The other such accessible computers 78 can be, for example: a service center computer where diagnostic information and other vehicle data can be uploaded from the car sharing vehicle or mobile devices 90, 94, 98; a client computer used by the vehicle owner or a subscriber/driver for such purposes as making car reservations, setting up or configuring subscriber preferences, controlling vehicle functions, or providing quantified assessments whether by communicating with the car sharing vehicle and/or the remote facility 80. The computer 78 can also be used for providing Internet connectivity such as DNS services or as a network address server that uses DHCP or other suitable protocol to assign an IP address to the car sharing vehicle.

The remote facility 80 may be designed to provide the car share vehicle and the mobile wireless devices 90, 94, 98 with a number of different system back-end functions. For example, the remote facility 80 may be used in part to implement the vehicle usage assessment request and to relay overall assessment and ranking. In such a case, the remote facility 80 may coordinate the time slots, store data pertaining to other aspects of the vehicle usage assessment, and/or provide authentication and authorization data to SRWC devices, users, and/or vehicles, such as the mobile wireless devices 90, 94, 98. The remote facility 80 may include one or more switches, servers, databases, live advisors, as well as an automated voice response system (VRS), all of which are known in the art. The remote facility 80 may include any or all of these various components, and preferably, each of the various components are coupled to one another via a wired or wireless local area network. The remote facility 80 may receive and transmit data via a modem connected to the land network 76. A database at the remote facility 80 can store account information such as subscriber authentication information, vehicle identifiers, profile records, behavioral patterns, and other pertinent subscriber information. Data transmissions may also be conducted by wireless systems, such as IEEE 802.11x, GPRS, and the like. Although the illustrated embodiment has been described as it would be used in conjunction with a manned remote facility 80 using a live advisor, it will be appreciated that the remote facility 80 can instead utilize a VRS as an automated advisor or, a combination of the VRS and the live advisor can be used. Information or data stored at the remote facility 80 can be sent to one or more vehicles or other devices (e.g., the mobile wireless devices 90, 94, 98) to carry out numerous functions and services. The car share vehicle, and the mobile wireless devices 90, 94, 98 can send data or information to the remote facility 80, which can then store such information.

The mobile wireless devices 90, 94, 98 are short-range wireless communication (SRWC) devices (i.e., a device capable of SRWC). In the illustrated embodiment of FIG. 1, these devices are depicted as smartphones. These devices may include: hardware, software, and/or firmware enabling cellular telecommunications and SRWC as well as other mobile device applications (or "apps"), such as a vehicle condition assessment app 92, 96, 100, respectively. The hardware of the mobile wireless devices 90, 94, 98 may comprise: a processor and memory (e.g., non-transitory computer readable medium accessible by the processor) for storing the software needed to implement the vehicle condition assessment application 92, 96, 100. The wireless devices 90, 94, 98 may include other software apps (e.g., having a software app or graphical user interface (GUI)), which may be preinstalled or installed by the user (or manufacturer). One implementation of an app may enable a remote facility to communicate with the car share vehicle and/or control various aspects or functions of the car share vehicle, some of which are listed above. Additionally, one or more apps may allow the user to connect with the remote facility 80 or call center advisors at any time.

The vehicle condition assessment apps 92, 96, 100 are wireless device applications that may act to establish and carry out the parts of the vehicle usage assessment such as the identification of the car share vehicle, first driver, receiving the SSD's vehicle usage assessment (quantified assessment, comments, and/or images), sending the vehicle usage assessments to the remote facility 80, display the driver's own user ranking, points, etc., as well as rewarding the driver and in some instances applying penalties against the driver. In at least some embodiments, one or more of the apps 92, 96, 100 comprise car sharing service apps that are used to authenticate the driver within the car sharing service system, search for and reserve vehicles, provide virtual vehicle keys for accessing and operating the vehicle during the reservation, and additionally include the vehicle usage assessment functions as a built in part of the app. In the discussion that follows, any of the functions or other features described for one of the vehicle condition assessment apps 92, 96, 100 may be included in the other app as well if needed or desired. The vehicle condition assessment app 92, 96, 100 uses the SRWC capability to provide access to the car share vehicle within a specified distance or range from the vehicle (e.g., a fifty foot radius from the vehicle). In some embodiments, the vehicle condition assessment apps 92, 96, 100 may also have the capability of sending and receiving information from one or more other wireless devices (e.g., the SSD's wireless device 94 to the service provider's wireless device 98) that also have the vehicle condition assessment app for purposes of transferring vehicle information and/or for other applicable communications. The vehicle condition assessment app may also be executed on or at a vehicle assessment station 88, which may be a free standing wireless screen device (e.g., kiosk) located at or near where the vehicle is located for pick up by the SSD. In some other embodiments, the vehicle condition assessment app may have the capability of communicating with the vehicle system and transferring data between the wireless application and the wireless communications device 30. The vehicle condition assessment apps 92, 96, 100 are also capable of communicating with the remote facility 80.

The processors of the wireless devices 90, 94, 98 execute an operating system for the handheld device, such as Android™, iOS™, Microsoft Windows™, and/or other operating systems. The operating systems may provide a user interface and a kernel, thereby acting as a central control hub that manages the interfacing between the hardware and software of the device. Moreover, the operating systems may execute mobile apps, software programs, and/or other software or firmware instructions. The processors can execute the vehicle condition assessment app 92, 96, 100 that enables a user of car share vehicle to store user information at a central facility and allows for data to be exchanged, execution of vehicle usage assessment and initiation of crediting the first drivers account. The memory of the wireless device 90, 94, 98 may include RAM, other temporary powered memory, any non-transitory computer-readable medium (e.g., EEPROM), or any other electronic computer medium that stores some or all of the software needed to carry out the various external device functions discussed herein. In other embodiments, the memory of the wireless devices 90, 94, 98 may be a non-volatile memory card, such as a Secure Digital™ (SD) card, that is inserted into a card slot of the wireless device 90, 94, 98.

The wireless devices 90, 94, 98 can include a SRWC circuit and/or chipset, as well as one or more antennas, which enablers carrying out SRWC, such as any of the IEEE 802.11 protocols, WiMAX™, ZigBee™, Wi-Fi Direct™, Bluetooth™ (including Bluetooth™ Low Energy (BLE)), or near field communication (NFC). The SRWC circuit and/or chipset may allow the wireless device 90, 94, 98 to connect to another SRWC device, such as wireless communications device 30 of vehicle 12. Additionally, the wireless devices 90, 94, 98 may include a cellular chipset thereby allowing the device to communicate via one or more cellular protocols, such as GSM/GPRS technology, CDMA or CDMA2000 technology, and/or LTE technology. The wireless devices 90, 94, 98 may communicate data over the wireless carrier system 70 using a cellular chipset and an antenna.

The field operations center 82 can be a stationary facility that includes one or more spots for vehicles in the car sharing system and may include one or more screen devices that can be used to carry out a vehicle usage assessment. The field operations center 82 can be located at a parking facility, a dedicated car sharing facility, a car dealership, a vehicle service facility, or any other location set up to accommodate a car sharing service.

The field operations center 82 can include other electronics, such as a computer (or stationary wireless device) 84 that can be used to communicate with other devices or components of system 10, including the car sharing vehicle 12 and the mobile wireless devices 90, 94, 98. The computer 84 can be a SRWC device and can include a SRWC circuit or chipset, such as the one described above with respect to the mobile wireless devices 90, 94, 98. Moreover, as discussed below, the third mobile wireless device 98 may be associated or a part of the field operations center 82 and usable by an operator or agent of the field operations center 82. Thus, either through use of the computer or the third mobile wireless device 98, the field operations center 82 may be able to access one or more such apps that enable it to communicate with the computer 78, remote facility 80, and/or mobile wireless devices 90 and 94 to exchange information, including notifications and access credentials for carrying out the methods described herein.

Additionally, there may be an assessment station 88 for use by an SSD, it can be located at or near the field operations center as well as directly within the area where the vehicles are located for pick-up. In this way when an SSD arrives at the vehicle they can use the assessment station to assess the vehicle right then and there even if they do not have a personal device. Assessment station 88 can include a user interface that enables a user to communicate (i.e., provide input and receive output) with the assessment station 88. This can include a graphical display, an audio speaker, one or more push buttons, currency insertion slots or collection ports, magnetic strip readers (e.g., for reading a credit or debit card), radio frequency identification (RFID) readers or tags (e.g., active or passive RFID devices or components), short-range wireless communication (SRWC) circuit or chipset, cellular chipset, and/or various other electrical components.

In some embodiments, the service provider may use multiple portable wireless devices 96 or stationary wireless devices 84. Moreover, the SSD and FD may have more than one wireless device. One embodiment may use the mobile wireless devices 90, 94, 98 for communications while another embodiment may instead use the stationary wireless devices 84 or 88 located at or near the service facility. In another embodiment, the portable wireless device 94 may be used for part of the vehicle usage assessment process while the stationary wireless device 84 may be used for another part of the vehicle usage assessment.

The vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. The discussion below of electronics 20 is hereby attributed to vehicle electronics (not shown) of the vehicle in the car sharing system.

Some of the vehicle electronics 20 are shown generally in FIG. 1 and may include a global navigational satellite system (GNSS) receiver 22, a body control module (BCM) 24, the wireless communications device 30, charging electronics 40, a vehicle system module (VSM) 48, and numerous other components and devices. Some or all of the different vehicle electronics 20 may be connected for communication with each other via one or more communications busses. A communications bus 44 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and/or IEEE standards and specifications, to name but a few.

The vehicle can include a variety of communication and control system components in the vehicle electronics 20, such as the global navigation satellite system (GNSS) receiver 22, the BCM 24, the wireless communications device 30, the charging electronics 40, push buttons 52, audio system 54, and display 58, as will be described below. The vehicle can also include other VSMs 48 in the form of electronic hardware components that are located throughout the vehicle and which may receive input from one or more sensors and use the sensed input to perform diagnostic, monitoring, control, reporting, and/or other functions. For example, the other VSMs 48 may include a center stack module (CSM), an infotainment unit, a powertrain control module, and/or a transmission control unit. Each of the VSMs 48 can be connected by the communications bus 44 to the other VSMs 48 as well as to the wireless communications device 30 and can be programmed to run vehicle system and subsystem diagnostic tests to check for things such as charge level. One or more of the VSMs 48 may periodically or occasionally have its software or firmware updated and, in some embodiments, such vehicle updates may be over the air (OTA) updates that are received from the computer 78 or the remote facility 80 via the land network 76 and/or the wireless communications device 30. As is appreciated by those skilled in the art, the above-mentioned VSMs 48 are only examples of some of the modules that may be used in the vehicle 12, as numerous others are also possible.

The global navigation satellite system (GNSS) receiver 22 receives radio signals from a constellation of the GNSS satellites 60. From these signals, the receiver 22 can determine the position of the vehicle 12 which may enable the vehicle 12 to determine whether it is at a known location, such as a field operations center 82. Moreover, the GNSS receiver 22 can provide this location data to the wireless communications device 30, which can then use this data to identify known locations, such as a parking lot or station. Additionally, the GNSS receiver 22 may be used to provide navigation and other position-related services to the vehicle operator such as the location of the next nearest field operations center. Navigation information can be presented on a display 58 (or other display within the vehicle) or can be presented verbally such as is done when supplying turn-by-turn navigation. The navigation services can be provided using a dedicated in-vehicle navigation module (which can be part of the GNSS receiver 22), or some or all navigation services can be done via the wireless communications device 30 installed in vehicle 12, wherein the position information is sent to a remote location for purposes of providing the vehicle 12 with navigation maps, map annotations (points of interest, charging facility, etc.), route calculations, and the like. The position information can be supplied to the remote facility 80 or other remote computer system, such as the computer 78, for other purposes, such as fleet management. Also, new or updated map data can be downloaded to the GNSS receiver 22 from the remote facility 80 via a vehicle wireless communications device 30.

The body control module (BCM) 24 is shown in the exemplary embodiment of FIG. 1 as being electrically coupled to communication bus 28. In some embodiments, the BCM 24 may be integrated with or part of a center stack module (CSM) and/or integrated with wireless communications device 30. Or, the BCM may be a separate device that is connected to other VSMs via bus 44. BCM 24 can include a processor and/or memory, which can be similar to processor 36 and memory 38 of wireless communications device 30, as discussed below. BCM 24 may communicate with wireless device 30 and/or one or more vehicle system modules, such as an engine control unit (ECU) (not shown), GNSS receiver 22, AVC 46, audio system 54, or other VSMs 26. BCM 24 may include a processor and memory accessible by the processor. Suitable memory may include non-transitory computer-readable memory that includes various forms of non-volatile RAM and ROM. Software stored in the memory and executable by the processor enables the BCM to direct one or more vehicle operations including, for example, controlling central locking, air conditioning, power mirrors, controlling the vehicle primary mover (e.g., engine, primary propulsion system), and/or controlling various other vehicle modules. For example, the BCM 24 can send signals to other VSMs, such as a request for sensor information. And, the BCM 24 may receive data from VSMs, including sensor readings or sensor data from various VSMs 48.

Additionally, BCM 24 may provide vehicle state information corresponding to the vehicle state or of certain vehicle components or systems. For example, the BCM may provide the device 30 with information indicating whether the vehicle's ignition is turned on, the gear the vehicle is presently in (i.e. gear state), and/or other information regarding the vehicle. The BCM 24 can obtain information from one or more other vehicle modules to obtain this information. Moreover, as mentioned above, the BCM 24 can be used to carry out a variety of vehicle functions.

A vehicle function is any function or operation that may be performed by the, including initiating or booting the wireless communications device 30, a GNSS module, an infotainment unit, a center stack module (CSM), or the other VSM 48. Additionally, a vehicle function may be starting the ignition or primary propulsion system, heating or cooling passenger seats included in the vehicle 12, performing air conditioning or heating of the vehicle 12 cabin, turning off/on or flashing headlights or other lights included in the vehicle 12, emitting an audible sound using the vehicle 12 horn or speakers (such as those included in the audio system 54), downloading information (e.g., information pertaining to the vehicle's system) or content data (e.g., audio/video playlists or files) from the remote facility 80 or the computer 78 (including information that may be particular to the user of an SRWC device and/or associated with an SRWC device), downloading or uploading information and/or content data from or to the SRWC device, and/or performing various other operations of the vehicle 12, many of which are described herein.

The wireless communications device (or wireless communications transceiver) 30 includes a short-range wireless communications (SRWC) circuit or chipset 32, a cellular chipset 34, a processor 36, memory 38, and/or antennas 33 and 35 (e.g., a single antenna, dual antenna, or any appropriate number of antennas). In some embodiments, the cellular chipset 34 may be included in a separate vehicle module, such as a telematics unit. And, in some embodiments, the wireless communications device 30 can include the cellular chipset 34 and can be referred to as a telematics unit. The wireless communications device 30 can be an OEM-installed (embedded) or aftermarket device that is installed in the vehicle 12 and that enables wireless voice and/or data communication over the wireless carrier system 70 and via wireless networking. This enables the vehicle 12 to communicate with the remote facility 80, other telematics-enabled vehicles, or some other entity or device. The wireless communications device 30 can use radio transmissions to establish a communications channel (a voice channel and/or a data channel) with the wireless carrier system 70 so that voice and/or data transmissions can be sent and received over the channel. By providing both voice and data communication, the wireless communications device 30 enables the vehicle to offer a number of different services including those related to vehicle usage assessment, navigation, car sharing, telephony, emergency assistance, diagnostics, infotainment, etc. Data can be sent either via a data connection, such as via packet data transmission over a data channel or via a voice channel using techniques known in the art. For combined services that involve both voice communication and data communication, the system can utilize a single call over a voice channel and switch as needed between voice and data transmission over the voice channel, and this can be done using techniques known to those skilled in the art.

According to one embodiment, the wireless communications device 30 utilizes cellular communication according to either GSM, CDMA, or LTE standards and, thus, includes the standard cellular chipset 34 for voice communications like hands-free calling, a wireless modem for data transmission and a dual antenna 35. It should be appreciated that the modem can either be implemented through software that is stored in the wireless communications device and is executed by the processor 36, or it can be a separate hardware component located internal or external to the wireless communications device 30. The modem can operate using any number of different standards or protocols such as LTE, EVDO, CDMA, GPRS, and EDGE. Wireless networking between the vehicle and other networked devices can also be carried out using the wireless communications device 30. For this purpose, the wireless communications device 30 may use the SRWC circuit 32 to communicate wirelessly according to one or more wireless protocols, including SRWC such as any of the IEEE 802.11 protocols, WiMAX, ZigBee™, Wi-Fi™ direct, Bluetooth™, Bluetooth™ Low Energy (BLE), or near field communication (NFC). When used for packet-switched data communication such as TCP/IP, the wireless communications device can be configured with a static IP address or can set up to automatically receive an assigned IP address from another device on the network such as a router or from a network address server.

The processor 36 can be any type of device capable of processing electronic instructions including microprocessors, microcontrollers, host processors, controllers, vehicle communication processors, and application specific integrated circuits (ASICs). It can be a dedicated processor used only for the wireless communications device 30 or can be shared with other vehicle systems. The processor 36 executes various types of digitally-stored instructions, such as software or firmware programs stored in the memory 38, which enable the wireless communications device to provide a wide variety of services. For instance, the processor 36 can execute programs or process data to carry out at least a part of the method discussed herein.

In some embodiments, the wireless communications device 30 can be used to provide a diverse range of vehicle services that involve wireless communication to and/or from the vehicle. Such services may include: semi-autonomous or fully-autonomous vehicle operation and control; turn-by-turn directions and other navigation-related services that are provided in conjunction with the GNSS receiver 22; airbag deployment notification and other emergency or roadside assistance-related services that are provided in connection with one or more collision sensor interface modules such as BCM 24; diagnostic reporting using one or more diagnostic modules; and/or infotainment-related services where music, webpages, movies, television programs, videogames and/or other information is downloaded by an infotainment module (not shown) and is stored for current or later playback. The above-listed services are by no means an exhaustive list of all of the capabilities of the wireless communications device 30, but are simply an enumeration of some of the services that the wireless communications device may be capable of offering. Furthermore, it should be understood that at least some of the aforementioned modules could be implemented in the form of software instructions saved internal or external to the wireless communications device 30. The aforementioned modules could be hardware components located internal or external to the wireless communications device 30, or they could be integrated and/or shared with each other or with other systems located throughout the vehicle 12, to cite but a few possibilities. In the event that the modules are implemented as the VSMs 48 located external to the wireless communications device 30, they could utilize the vehicle bus 44 to exchange data and commands with the wireless communications device 30.

The vehicle's electronics 20 also include a number of vehicle user interfaces that provide vehicle occupants with a means of providing and/or receiving information, including a pushbutton(s) 52, an audio system 54, a microphone 56, and the visual display 58. As used herein, the term "vehicle user interface" broadly includes any suitable form of vehicle telematics such as an electronic device, including both hardware and software components, which is located on the vehicle and enables a vehicle user to communicate with or through a component of the vehicle. The pushbutton(s) 52 allow manual user input into the wireless communications device 30 to provide other data, response, or control input. The audio system 54 provides audio output to a vehicle occupant and can be a dedicated, stand-alone system or part of the primary vehicle audio system 54. According to the particular embodiment shown here, the audio system 54 is operatively coupled to both the vehicle bus 44 and an entertainment bus (not shown) and may provide AM, FM, and satellite radio, CD, DVD and other multimedia functionality. This functionality can be provided in conjunction with or independent of an infotainment module. The microphone 56 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. The visual display or touch screen display 58 is preferably a graphics display on the instrument panel or a heads-up display reflected off of the windshield and can be used to provide a multitude of input and output functions. Various other vehicle user interfaces can also be utilized, as the interfaces shown in FIG. 1 are only an example of one particular implementation.

Figure 2:
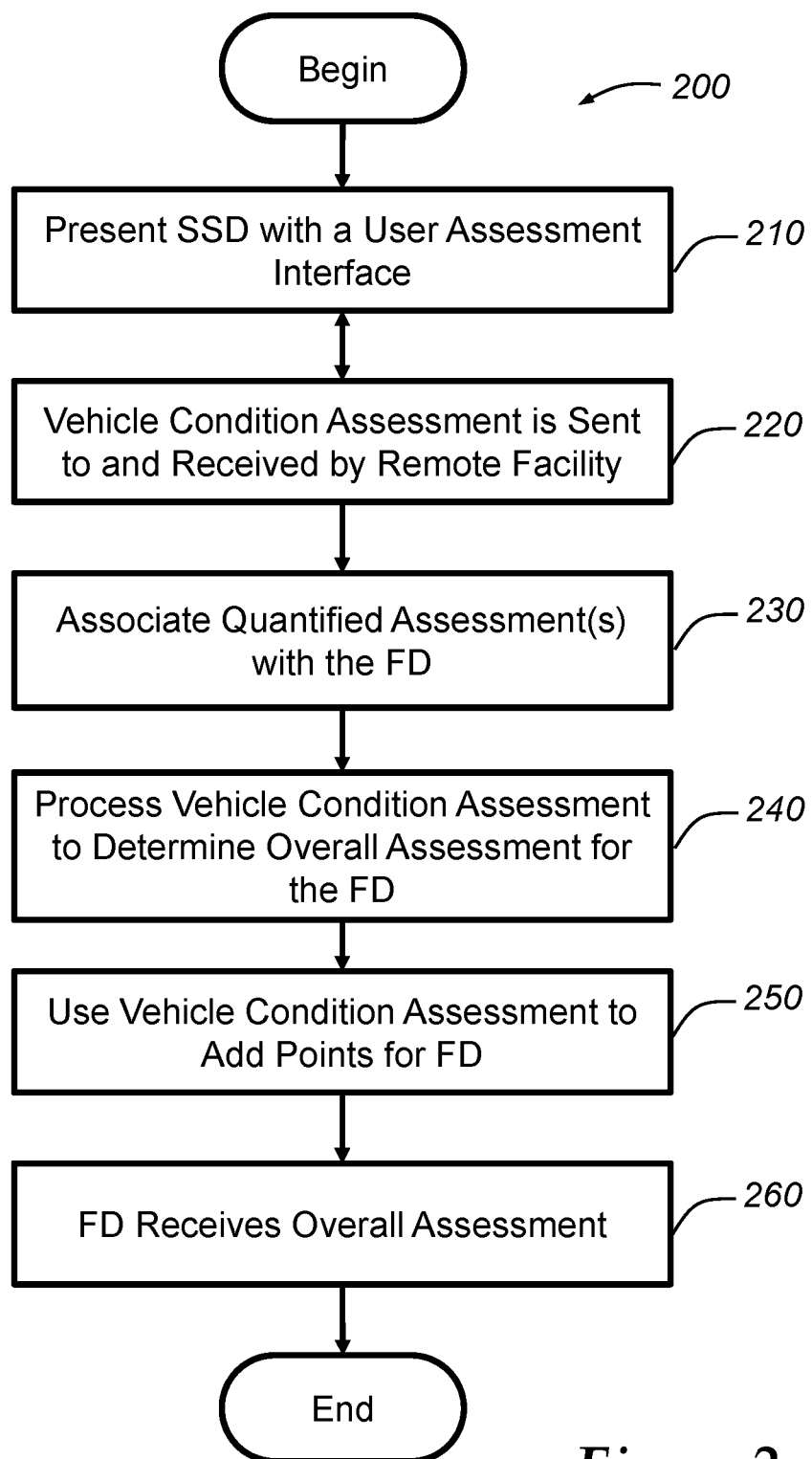
FIG. 2 is a flow chart illustrating an embodiment of a method of generating a vehicle usage assessment for a first driver of a vehicle participating in a car sharing service based on a vehicle condition assessment provided by a second driver.

With reference to FIG. 2, there is shown an embodiment of a method 200 for establishing and carrying out a vehicle usage assessment for a first driver (FD) of a vehicle based on a vehicle condition assessment of the vehicle by a subsequent, second driver (SSD) who is the next driver following the FD to use the vehicle. While the method 200 is described in conjunction with the communication system 10 of FIG. 1, it is possible for one or more embodiments of the method 200 to be used in other operating environments.

The steps of the method 200 discussed below may be at least primarily carried out by a provider of the car sharing service using, for example, the remote facility 80 and/or, in some embodiments, the field operations center 82. If an app is being utilized by the drivers on their mobile wireless devices, it may require that a user account have been previously established and stored at the remote facility 80. When the application (such as vehicle condition assessment app 92, 98) is utilized on the mobile wireless device, the app can access the user account at the remote facility for authentication of the driver and to retrieve the relevant car reservation (rental) information. At the start of a reservation, such as when the SSD takes possession of the vehicle, the app may then be used also to prompt the SSD to conduct a mandatory or voluntary vehicle condition assessment that may be inputted to the app and transferred to the remote facility 80 for storage and use in updating the overall assessment (rating/ranking) of the immediately preceding first driver (FD). And once the FD is notified and given his or her overall assessment, the application may also be able to allocate a credit or reward to the account of the FD if either the overall assessment or ranking for the first driver exceeds a predetermined threshold.

The method 200 begins with the step 210, wherein the SSD is presented with a user assessment interface for purposes of entering vehicle condition assessments. In some embodiments, this user assessment interface may be provided by the remote facility 80 at the start of the reservation, by uploading it to the SSD's mobile wireless device 94, or to the vehicle communication device 30, or to another device accessible to the SSD (e.g., to kiosk 88 at the field operations center 82), or may be provided by the remote facility 80 at a later time, such as to a home computer or laptop used by the SSD (e.g., computer 78). In other embodiments, the user assessment interface may be provided as a built-in portion of the app 92, 96, 100 and thus may be provided by the remote facility or another source (such as an app store) as part of an initial download transmitted to the mobile wireless device 90, 94, and/or 98. Then, as part of the SSD beginning the rental of the vehicle (e.g., taking possession of the vehicle at the field operations center 82 or elsewhere), the SSD may use the app to access the user assessment interface to provide the vehicle condition assessment that is used in rating the prior, first driver. This may include the SSD receiving a prompt (notification) to carry out the assessment, and this prompt may be provided by the app 96 on the mobile wireless device 94 when the SSD first takes possession of the vehicle.

The user assessment interface comprises a graphical user interface that provide one or more input fields used by the SSD to assess the condition of various aspects of the vehicle. This may be implemented as an input of a single rating for the overall vehicle condition, or may include inputs for each of a number of different categories of vehicle characteristics, as will be discussed below.

In embodiments that do not use the app 96 to authenticate the SSD and receive the vehicle condition assessment from the SSD, other means may be used to identify the SSD and obtain the assessment. In one example, the field operations center 82 can utilize the third mobile wireless device 98 (for example a handheld wireless tablet) to provide the identification information of the SSD to the computing system. This may be accomplished by manually inputting information into a mobile wireless device 98. Or the kiosk 88 may be used to provide the user assessment interface. The vehicle associated with the SSD may have identifying information as well which could be a visible identifier such as something associated with the vehicle like a license plate, VIN number or, a windshield sticker.

Generally speaking, each step of the method described herein for initiating and executing a vehicle usage assessment can be completed by any of the SRWC devices (e.g., wireless communication device 30 of the vehicle 12, any or all of the mobile wireless devices 90, 94, 98, computer 84, or kiosk 88) or other communication devices. Additionally, according to various embodiments, the method can use multiple communication paths, the method can be carried out using numerous devices, and/or a user may utilize different devices throughout the method. For example, the field operations center 82 may initiate the vehicle usage assessment using the third mobile wireless device 98 to identify the SSD and then use the wireless communications device 30 to convey vehicle usage assessment, as discussed more below. Furthermore, the initial assessment request (step 220) could be sent to the wireless device 30 of the vehicle and the SSD may respond using the mobile wireless device 94. This is by no means an exhaustive list of how alternative paths and devices may be used and, thus, a variety of other combination could be employed as well. The method 200 continues to step 220.

In step 220, the SSD completes the vehicle condition assessment which is then sent to and received by the remote facility 80. The vehicle usage assessment may include questions or input prompts regarding different categories of vehicle characteristics such as cleanliness, fuel level, charge level, system settings, smell/odor, exterior body condition, interior condition just to name a few. Input fields are provided so that the SSD may input a quantified assessment of each characteristic. The input fields may be implemented as ones that take a quantified assessment for each characteristic being rated, and this can be done by providing input fields that allow a numerical input or ratings-type input (such as selecting 1-5 stars).

As will be discussed below, once the SSD provides the vehicle condition assessment, that assessment may be used by the remote facility 80 to provide a reward to the first driver (FD). Or, the system may allow the SSD to manually specify such a reward (e.g., a tip) that can be charged back to the SSD's account in the car sharing service. Once the SSD has submitted the vehicle condition assessment, the system will associate that assessment with the FD and use it to generate an overall assessment that may be, for example, a weighted or unweighted combination of the different assessments for the different characteristics of the vehicle. Furthermore, when the vehicle condition assessment is received, the communications system 10 can confirm completion of the assessment, generate the overall assessment and a rating and/or rank the FD relative to other drivers subscribed to the car sharing service, and if the overall assessment and/or ranking for the FD exceed a predetermined threshold it can initiate the allocation of a reward to the FD by the car sharing service. Conversely, if the overall assessment and/or ranking fall below a predetermined threshold the FD may be penalized. The penalty may be anything from incurring a maintenance fee, damage fee, or even exclusion from the vehicle sharing service. The FD may be notified of the assessment and any change in score or ranking via the FD's wireless device 90 with or without the vehicle condition app 92. In this way FDs can know how others view usage of a vehicle after them and it will aid them in being more conscious of the state they leave the vehicle in for the next driver.

The vehicle condition assessment provided by the SSD via the user assessment interface involves the SSD providing, and the remote facility receiving, one or more quantified assessments for one or more characteristics of the vehicle. The SSD may make the determination by selecting from a predetermined pool of quantified assessment choices such as 0-5 stars, 0-5 on a number scale, or a percentage from 0-100% just for example. The assessment may be comprised of 1 question or multiple questions. The assessment may simply ask the SSD to rate the overall condition of the vehicle on a quantified scale for example of 1-5 or 1-5 stars. Or, the assessment may be composed of multiple questions pertaining to specific characteristics or condition of the vehicle. The assessment maybe based on an assignment of a number of stars, a numerical value, or a percentage for example and each individual assessment may be given a weight. Weights for rating the condition/characteristics of the vehicle after use by the FD can be applied at the remote facility 80 to the assessment values to provide an evaluation of the FD in an overall assessment score or ranking. The input fields for providing the quantified assessments may be pre-populated and the SSD may simply select from the input field which rating to give the FD. Or the input fields could be provided with directions and the SSD may enter an assessment that meets the requirements specified. In some embodiments, the user assessment interface enables the SSD to input comments or upload photos/images to add to or support the assessment provided. Thus, for example, where the app 96 is used to provide photos in support of the assessment, that can be done by way of the app 96 accessible a camera on the mobile wireless device 94 to take the photos and then upload them to remote facility 80.

At step 230, the quantified assessments that make up the SSD's vehicle condition assessment, as well as any included photos or comments, are associated with the FD. This may be done at the remote facility 80 by determining which car sharing service subscriber (driver) last used the vehicle. This may be done based on records within the car sharing service database at the remote facility 80 that uses the VIN or other identifying information for the vehicle 12 to determine which subscriber was the most recent driver of that same vehicle 12. That most recent driver (the FD) then has the assessment added to his or her user account information.

At step 240, the vehicle condition assessment that is now associated with the FD is processed to determine an overall assessment for the FD, recalculate a new rating or ranking based on the quantified assessment(s) provided by the SSD and other historical data for the FD. For example, where multiple quantified assessments of the vehicle condition are received for different characteristics of the vehicle, they may be combined into a single overall rating or other assessment. Or, they may be used to determine a corresponding plurality of calculated average scores for the different characteristics. Thus, for example, if the quantified assessments include ratings from the SSD for vehicle cleanliness, fuel level, and odor, those ratings may be combined into a single rating for the FD, either by averaging the three ratings together or by some weighted combination of them. Alternatively or additionally, those three ratings may be averaged into a running average of those characteristics for the FD over the course of a number of rentals of different cars by the FD. In this case, for example, the rating by the SSD for vehicle cleanliness can be combined into a running average of the cleanliness ratings received by the FD over his or her previous rentals of various vehicles.

As noted above, factors for assessment may include fuel level, charge level, cleanliness, radio station, odor, exterior condition, and interior condition of the vehicle. Once an overall assessment is established, it can be used for ranking or determination of whether to reward or penalize the FD. For example, the assessment may be used to update the ranking of the FD relative to the other drivers subscribed to the car sharing service; e.g., after a particularly positive assessment from an SSD, a FD's ranking might improve, for example, from 302 out of a total of 14,892 subscribers to a new ranking of 296/14,892. As another example, the assessment may be used to update the FD's overall rating by averaging it in with a running average rating, such that it might change, for example, from 4.6 stars to 4.7 stars. Furthermore, the overall assessment (e.g., rating or ranking) can be compared against an established or predetermined minimum assessment to determine if the FD should be penalized and/or compared against an established minimum assessment ranking to determine if a reward/credit should be applied toward the FDs account. This scoring function can be implemented in a variety of methods such as by the remote facility 80 as a part of the FD's user account.

Also, at step 250, the vehicle condition assessment received from the SSD may be used to add points that may be redeemed by the FD to receive a reward, such as a reduced future rental cost or free extra hour rental. This may be done by determining a point value that is based at least in part on the assessment. These reward points may also be based on other factors, such as the total amount of reservations or hours of reservation used by the FD in the car sharing service. Thus, the point value may represent a total amount of "frequent driver" points earned by the FD in the car sharing service, and this point value may be used to provide the driver with a reward, such as by allowing the driver at his or her discretion to redeem the points for a financial or other benefit.

Where the assessment is used to provide a tip from the SSD to the FD, payment, credit, or other consideration may be transferred from an account associated with the SSD or the car sharing entity to an account associated with the FD, such as via a debit/credit entry on the FD and SSD's user accounts within the car sharing service. Alternatively, user accounts hosted or maintained by a third party account manager, such as PayPal™, Venmo™, QuickPay™, or other account may be used for account payment transfers.

Apart from a tip based on the assessment, the system may provide for tipping of the FD directly by the SSD using a tip pool comprising funds collected by the car sharing service. This enables tipping between members of the car sharing service that are not parties to any single transaction while maintaining anonymity between the parties, if desired. And, by providing the tip pool, this approach encourages SSDs to tip when appropriate and rewards FDs who return vehicles in exceptional condition. The tip may be initiated by the SSD by providing a tip request specifying a tip amount to be provided to the FD. This may be done via the vehicle condition assessment app 92 such that the tip request is sent to the remote facility 80 where checks can be made to determine that the SSD is authorized to provide tips, and authorize the tip amount, and then, if successfully authorized, the remote facility 80 can carry out a transaction to pay or credit the FD with the tip amount. This payment or crediting may be done in any of the manners previously noted with the assessment-based tip.

The tip pool may comprise monies amassed by the car sharing service through user receipts from prior reservations, or otherwise. The total amount of money available in the tip pool for use by all users may be maintained at a level dependent upon the number of current users in the car sharing service. Members wishing to provide a tip to a FD may be authorized based on different factors, such as the amount paid by that member over time into the car sharing service for prior car reservations. For example, a member may be able to tip up to a maximum amount (e.g., $5) and for a total among all tips awarded by that driver that equal no more than some percentage (e.g., 2%) of all receipts from that member. Thus, a member that over time has paid $1,000 total in car reservation fees may be able to tip up to a total of $20 to FDs, but not more than $5 to any single FD.

Finally, at step 260, the FD receives his or her overall assessment and any update in ranking, rating, or points. This notification to the FD may be done via the app 92 of the FD's mobile wireless device 90. It may also include any additional comments or photos that had been provided by the SSD relating to the assessment. As will be appreciated, this approach allows the SSD to effectively rate the FD without any sharing of user identities of the parties involve, thereby providing anonymity by both parties. The method 200 then ends.

Figure 3:
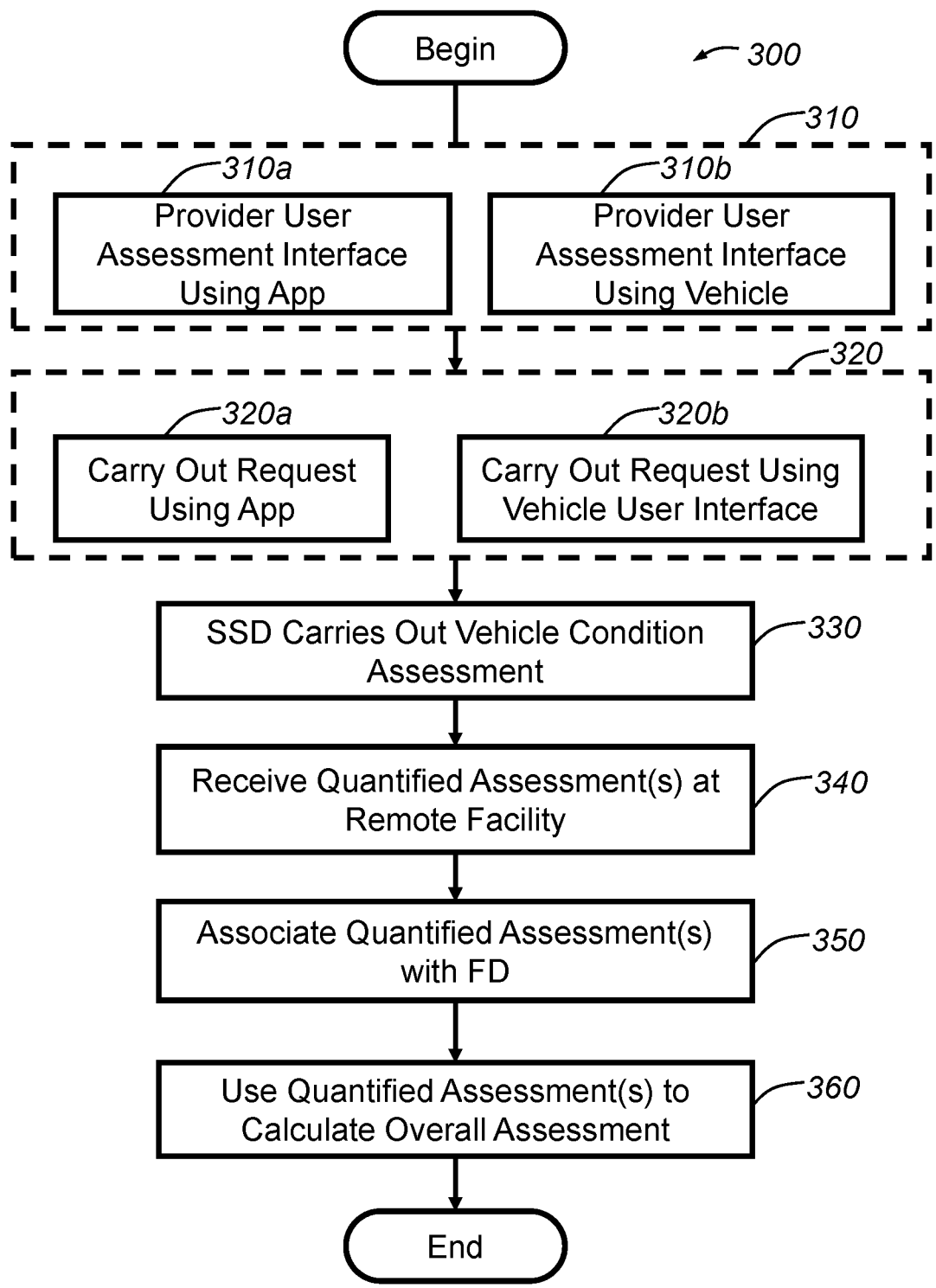
FIG. 3 is a flow chart illustrating another embodiment of a method of generating a vehicle usage assessment for a first driver of a vehicle participating in a car sharing service based on a vehicle condition assessment provided by a second driver.

With reference to FIG. 3, there is shown another method of establishing a vehicle usage assessment. Many of the steps and methods are similar to those of system 200 described in FIG. 2 and, for purposes of brevity, reference will be made to analogous steps of method 200 in lieu of providing a full discussion.

In step 310, a subsequent, second driver (SSD) is provided with a user assessment interface after being authenticated and associated with a particular vehicle being rented by the SSD in a car sharing service. This step is analogous to step 210 of method 200 (FIG. 2) and, thus, the discussion of step 210 is incorporated into step 310. As indicated above, the SSD and vehicle can be identified in a variety of ways, including through use of the app 96 that logs the SSD into their user account at the remote facility 80 for retrieval of the reservation and vehicle information (step 310a) or through use of a visual identifier or other passive identifying technique (step 310b).

If step 310a is used, then the remote facility downloads a virtual vehicle key to the app 96, which, during the rental period, enables the SSD to unlock and operate the vehicle using short range wireless communication (SRWC) between the wireless mobile device 94 and the vehicle 12. Techniques for providing and using virtual vehicle keys are known to those skilled in the art. Once the virtual vehicle key is used by the SSD at the vehicle to access it, the app 96 detects this event and, in response, prompts the SSD to carry out the vehicle condition assessment via the app.

If instead, step 310b is used, then another means of identifying the SSD and vehicle is used. For example, the SSD could sign into his or her subscriber account by providing a username and password via the touchscreen display 58 in the vehicle 12. Or, a visual identifier on or at the vehicle, on or at the field operations center 82, or on or at the assessment station 88 can be recognized and processed to confirm the identity of the vehicle 12. In one embodiment, this can include using a camera included on the first mobile device 90 that can capture an image of a visual identifier (such as a tag or other identifying symbol or character(s)) and, then, the image can be processed to resolve the vehicle 12 or the assessment station 88 (or center 82) to a particular vehicle. Other passive identifying techniques can include any of those that do not require or desire a response or information from the driver thereof. The method 300 continues to step 320.

In step 320, a request for completion of a vehicle usage assessment is initiated. Communication with the SSD may take several different forms, such as via the vehicle or a mobile wireless device. In particular, non-limiting examples include communicating wirelessly through the SSD's mobile wireless device 94, communicating through the instrument panel interactive touch screen display 58 that enables visual communication, communicating verbally through the vehicle's audio system 54, through sending an email or other wireless message to the SSD, or by any other means of communicating between the SSD and the field operations center. The SSD's communication to a field operations center may be a bilateral communication which may include responding to a series of prompts either from the remote facility 80, software on the processor 34, the field operations center 82, or the app software 96, 100 located on the mobile wireless devices 94, 98. For example, the SSD mobile wireless device may prompt the SSD to input notification preferences, payment preferences, and contact preferences which may then be relayed to a service provider. Alternatively, the notification may be provided to the operator from the vehicle or remote facility via other means such as vehicle condition assessment app 92, 96.

In steps 320a and 320b, the request described above is carried out or communicated to the vehicle 12, assessment station 88, or SSD mobile wireless communication device 94. These steps 320a and 320b represent only two possibilities of many that were described earlier or that are made apparent to those skilled in the art based on the discussion herein. In 320a, the request may be carried out using the app 96 stored on the SSD's mobile wireless device 94 which may prompt the SSD to carry out the assessment, as described above. Or, in step 320b, the request may be carried out via the vehicle's installed user interface (touchscreen 58 and audio system 54) or via kiosk 88 or the third wireless mobile device 98. The method 300 continues to step 330.

In step 330, the SSD carries out the vehicle condition assessment, by providing quantified assessments of the various vehicle characteristics of interest. This may include providing photos and/or comments. The vehicle condition assessment is sent from the SSD and received by the remote facility 80. The assessment may be based on pre-configured parameters such as rating scales of 0-5 stars, number rating of 1-5, a percentage of 0-100% and a weighted scoring system. This response may be inputted by the SSD into the app 96 or into the vehicle telematics via the vehicle user interfaces 52, 56, 58, or by input into assessment station (kiosk) 88 in response to a prompt requesting a quantified assessment. Furthermore, the SSD can upload photos or comments. Photos may be taken using a camera on the SSD's mobile wireless device. The method continues in step 340.

In step 340, the quantified assessments are received at the remote facility 80. This step is analogous to step 220 of method 200 and, thus, such discussion is incorporated herein. The method 300 proceeds to step 350.

Once the quantified assessments are received, system associates the one or more quantified assessments with an immediately preceding first driver of the vehicle. This is indicated by step 350 and is similar to step 230 of method 200 (FIG. 2). Accordingly, the discussion therein is incorporated into step 350.

At step 360, the quantified assessments are used to calculate or otherwise generate an overall average score or other overall assessment. As explained above, this overall assessment can be calculated from different quantified assessments for different characteristics of the vehicle. Additionally, it also possible to generate individual average scores for each of a plurality of the different characteristics of the vehicle. Lastly by comparing the scores, which are associated with the FD of the vehicle, FDs can be ranked. Ranking could also be based simply on a straight overall assessment score. The quantified assessment, overall assessment or individual average scores may be compared against a predetermined threshold to determine how the FD should be addressed. The quantified assessment, overall assessment or individual average scores may exceed, meet, or be below a predetermined threshold and will determine whether the FD is rewarded, penalized or excluded from the vehicle sharing service. The ranking is generated by comparing any of the quantified assessments and/or overall assessment with those of other drivers/members in the vehicle sharing community. Ranking may also be used to incentivize drivers, where the highest ranking driver may be rewarded and the lowest ranking member may be penalized.

In step 370, the overall assessment (ranking and/or rating) of the FD is provided to the FD such as via the app 92 such that it may be viewed by the FD when running the app 92. The assessment may be posted or otherwise provided to members of the vehicle sharing service and may be provided within the vehicle condition app for the FD and all such members to view. In this way, an owner/manager of a vehicle placed into the car sharing service can review the FD's overall rating or ranking when deciding whether to accept a reservation request from the FD. The method 300 then ends.

In one embodiment, the method 200, the method 300, or parts thereof can be implemented in a computer program (or "application") such as would be resident on a server or other computing device at the central facility. The server program may be embodied in a non-transitory, computer readable medium and including instructions usable by one or more processors of one or more computers of one or more systems. The computer program may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media (such as memory 38, memory in BCM 24, memory of devices 90, 94, 98, and/or memory of computer 84), which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering any one or more of the following: "A"; "B"; "C"; "A and B"; "A and C"; "B and C"; and "A, B, and C."

The invention claimed is:

1. A computer implemented method of generating a vehicle usage assessment for a first driver of a vehicle participating in a car sharing service based on a vehicle condition assessment of the vehicle that is provided by a second, subsequent driver, the method comprising the steps of:

providing a user assessment interface configured to communicate with a server system, the user assessment interface including a graphical user interface for display by a screen device, the graphical user interface providing a second, subsequent driver with one or more input fields by which the second driver provides a plurality of quantified assessments that are used to determine the vehicle usage assessment for the first driver, each corresponding to a different one of the characteristics of the vehicle in the car sharing service;

providing a virtual key to the second, subsequent user, the virtual key allowing the second, subsequent user to unlock and operate the vehicle during a rental period;

prompting the second, subsequent user, upon using the virtual key to unlock the vehicle, to complete the one or more input fields to provide the plurality of quantified assessments;

receiving, by the server system, the plurality of quantified assessments provided by the second driver for the characteristics of the vehicle;

associating, by the server system, the plurality of quantified assessments with an immediately preceding first driver of the vehicle;

generating, by the server system, an overall assessment for the first driver using at least one of the plurality of quantified assessments, wherein the overall assessment is represented by a score on a quantified scale, wherein the quantified assessments are weighted relative to each other when generating the overall assessment;

provide a tip pool comprising funds collected by the car sharing service;

receive a tip request from the second, subsequent driver, specifying a tip amount to be provided to the first driver;

authorize the tip amount based on a defined percentage of all receipts associated with the second, subsequent driver; and pay or credit the first driver with the tip amount from the tip pool.

2. The method of claim 1, wherein the overall assessment includes a single overall average score calculated from different quantified assessments for different characteristics of the vehicle, or a plurality of calculated average scores for each of a plurality of the different characteristics of the vehicle.

3. The method of claim 1, wherein the score comprises a ranking of the first driver relative to other drivers subscribed to the car sharing service that is based on the overall assessment.

4. The method of claim 3, wherein, when the overall assessment for the first driver exceeds a predetermined threshold, the first driver is given a reward by the car sharing service.

5. The method of claim 1, wherein the screen device is a smartphone carried by the second driver and wherein the providing step further comprises transmitting an app to the smartphone, wherein the graphical user interface is provided by the app when the app is executing on the smartphone.

6. The method of claim 5, wherein the first driver has a smartphone that includes the app and wherein either the overall assessment and/or the plurality of quantified assessments are received by the app on the first driver's smartphone and are displayed via the graphical user interface of the app on the first driver's smartphone.

7. The method of claim 6, further comprising receiving at the server system a comment or photo entered into the app by the second driver.

8. The method of claim 1, wherein the screen device is a touchscreen display in the vehicle, whereby the providing step further comprises installing the user assessment interface in the vehicle either during manufacturing of the vehicle or by downloading the user assessment interface to the vehicle via a vehicle telematics unit.

9. The method of claim 1, wherein the subsequent driver confirms, via the graphical user interface, that the vehicle usage assessment provided is for the vehicle the subsequent driver is presently assessing.

10. The method of claim 1, wherein the characteristics of the vehicle comprise characteristics from two or more of the following categories: exterior vehicle condition, interior vehicle condition, vehicle cleanliness, fuel level, charge level, and radio station settings.

11. The method of claim 1, further comprising the step of determining a point value for the first driver based at least in part on the overall assessment.

12. The method of claim 11, wherein the point value represents a total amount of points earned by the first driver in the car sharing service, and wherein the method further comprises providing the first driver with a reward by the car sharing service using the points.

13. A system for use in generating a vehicle usage assessment for a first driver of a vehicle participating in a car sharing service based on a vehicle condition assessment of the vehicle that is provided by a second, subsequent driver, the system comprising at least one computing device having an electronic processor, computer-readable memory accessible by the processor, and software stored on the memory that when executed by the processor configures the system to:
provide a virtual key to the second, subsequent user, the virtual key allowing the second, subsequent user to unlock and operate the vehicle during a rental period;
prompt the second, subsequent user, upon using the virtual key to unlock the vehicle, to provide a plurality of quantified assessments of one or more corresponding characteristics of the vehicle;
receive from the second driver the one or more quantified assessments of one or more corresponding characteristics of the vehicle, wherein the one or more quantified assessments are received from the second driver via a graphical user interface on a smartphone carried by the second driver;
receive, from the second driver via the smartphone, comments and/or photos indicative of at least some of the one or more characteristics;
associate the one or more quantified assessments with an immediately preceding first driver;
determine an overall assessment for the first driver using at least one of the one or more quantified assessments;
send the overall assessment to a smartphone carried by the first driver;
provide a tip pool comprising funds collected by the car sharing service;
receive a tip request from the second, subsequent driver, specifying a tip amount to be provided to the first driver;
authorize the tip amount based on a defined percentage of all receipts associated with the second, subsequent driver; and
pay or credit the first driver with the tip amount from the tip pool.

14. The system of claim 13, wherein the software, when executed by the processor, configures the system to provide the first driver with at least one of the comments and/or photos.

15. The system of claim 13, wherein the software, when executed by the processor, configures the system to:
rank the first driver relative to other drivers participating in the car sharing service based on the overall assessment; and/or
determine a point value for the first driver based at least in part on the one or more quantified assessments.

16. The system set forth in claim 13, wherein the one or more quantified assessments are received via an app executing on the second driver's smartphone, the app being configured to cause the second driver's smartphone to transmit the one or more quantified assessments to the computing device at a remote facility.

17. A non-transitory, computer-readable medium for use in generating a vehicle usage assessment for a first driver based upon a vehicle condition assessment of a vehicle provided by a second, subsequent driver of the vehicle, the computer-readable medium having stored thereon software that, when executed by an electronic processor, configures the processor to:
provide a virtual key to the second, subsequent driver, the virtual key allowing the second, subsequent driver to unlock and operate the vehicle during a rental period;
prompt the second, subsequent driver, upon using the virtual key to unlock the vehicle, to provide a plurality of quantified assessments of one or more corresponding characteristics of the vehicle;
receive from the second subsequent driver the plurality of quantified assessments that are used to determine the vehicle usage assessment for the first driver, each of the plurality of quantified assessments corresponding to a different characteristic of the vehicle, wherein the plurality of quantified assessments are received from the second, subsequent driver via a graphical user interface on a smartphone carried by the second, subsequent driver;
associate the plurality of quantified assessments with an immediately preceding first driver;
determine an overall assessment for the first driver using at least one of plurality of quantified assessments, wherein the quantified assessments are weighted relative to each other when generating the overall assessment;
rate the first driver relative to other drivers participating in the car sharing service based on the overall assessment; and
send the rating to a smartphone carried by the first driver;

provide a tip pool comprising funds collected by the car sharing service;

receive a tip request from the second, subsequent driver, specifying a tip amount to be provided to the first driver;

authorize the tip amount based on a defined percentage of all receipts associated with the second, subsequent driver; and pay or credit the first driver with the tip amount from the tip pool.

* * * * *